United States Patent
Mosanu et al.

(10) Patent No.: US 10,968,371 B2
(45) Date of Patent: Apr. 6, 2021

(54) MOISTURE CURABLE HOT MELT SEALANT COMPOSITION INCLUDING SILANE FUNCTIONAL POLYURETHANE

(71) Applicant: H.B. Fuller Company, St. Paul, MN (US)

(72) Inventors: Claudia Mosanu, Blaine, MN (US); Marietta B. Helmeke, Little Canada, MN (US)

(73) Assignee: H.B. Fuller Company, St. Paul, MN (US)

( * ) Notice: Subject to any disclaimer, the term of this patent is extended or adjusted under 35 U.S.C. 154(b) by 0 days.

(21) Appl. No.: 16/672,140

(22) Filed: Nov. 1, 2019

(65) Prior Publication Data
US 2020/0140726 A1    May 7, 2020

Related U.S. Application Data

(60) Provisional application No. 62/755,053, filed on Nov. 2, 2018.

(51) Int. Cl.
| | | |
|---|---|---|
| C09J 123/22 | (2006.01) | |
| C03C 27/10 | (2006.01) | |
| C09J 5/06 | (2006.01) | |
| C09J 11/04 | (2006.01) | |
| C09J 11/08 | (2006.01) | |
| C09J 123/02 | (2006.01) | |
| C09J 123/26 | (2006.01) | |
| E06B 3/663 | (2006.01) | |

(52) U.S. Cl.
CPC ............ *C09J 123/22* (2013.01); *C03C 27/10* (2013.01); *C09J 5/06* (2013.01); *C09J 11/04* (2013.01); *C09J 11/08* (2013.01); *C09J 123/02* (2013.01); *C09J 123/26* (2013.01); *E06B 3/66333* (2013.01); *E06B 3/66357* (2013.01); *C09J 2423/00* (2013.01); *C09J 2493/00* (2013.01)

(58) Field of Classification Search
CPC .... E06B 3/66357; E06B 3/66333; E06B 3/66; C09J 123/22; C09J 123/26; C09J 123/02; C09J 11/08; C09J 11/04; C09J 27/10; C09J 5/06; C09J 2493/00; C09J 2423/00; C08L 75/04; C08L 23/22
See application file for complete search history.

(56) References Cited

U.S. PATENT DOCUMENTS

| | | | | |
|---|---|---|---|---|
| 6,355,317 B1 * | 3/2002 | Reid | ............... | C08G 18/10 156/109 |
| 6,457,294 B1 * | 10/2002 | Virnelson | ............... | C03C 27/10 52/786.13 |
| 6,803,412 B2 | 10/2004 | Nguyen-Misra et al. | | |
| 8,637,605 B1 | 1/2014 | Mosanu et al. | | |
| 9,023,946 B2 | 5/2015 | Suen et al. | | |
| 2011/0042004 A1 | 2/2011 | Schubert et al. | | |
| 2013/0237676 A1 | 9/2013 | Ferenz et al. | | |
| 2016/0311963 A1 | 10/2016 | Lobert et al. | | |
| 2017/0226285 A1 | 8/2017 | Lobert et al. | | |

FOREIGN PATENT DOCUMENTS

WO    WO 2004-085565    10/2004

OTHER PUBLICATIONS

Oppanol product literature, Sep. 21, 2018, BASF, https://products.basf.com/en/Oppanol.html (6 pages).
Oppanol B Types product literature Apr. 1999, BASF Aktiengsellschaft, Ludwigshafen, Germany (14 pages).
Ineos Oligomers product literature, Indopol Polybutenes, Sep. 28, 2018, (3 pages).
Sylvalite RE 110L rosin ester product literature, Aug. 22, 2017, Kraton Corp., (2 pages).
Dynasylan Product Range product literature, Jun. 1, 2018, (16 pages) Evonik Resources Efficiency GmbH, Hanau, Germany.
Dynasylan 1146 product literature, Dec. 2011, (3 pages) Evonik Industries AG, Hanau, Germany.
Vestoplast 508 product information, Sep. 14, 2018, (2 pages) MatWeb.
Butyl Polymers Grade Slate product literature, 2017, (2 pages), ExxonMobil Chemical.
Vistalon EPDM Rubber product literature, 2017, (2 pages), ExxonMobil Chemical.

\* cited by examiner

*Primary Examiner* — Donald J Loney
(74) *Attorney, Agent, or Firm* — Kirsten Stone; Allison Johnson

(57) ABSTRACT

A moisture curable hot melt sealant composition that includes a silane-functional polyurethane that is free of isocyanate groups, a thermoplastic elastomer having a weight average molecular weight of at least 100,000 grams per mole and being derived from 0% by weight to no greater than 30% by weight styrene, based on the weight of the thermoplastic elastomer, the thermoplastic elastomer being selected from the group consisting of butyl rubber, ethylene-propylene rubber, ethylene-propylene diene rubber, thermoplastic polyolefin elastomer, styrene block copolymer, and combinations thereof, a first tackifying agent that includes from 0% by weight to less than 15% by weight aromaticity based on the weight of the tackifying agent, the first tackifying agent being selected from the group consisting of aliphatic tackifying agent, aromatic-modified aliphatic tackifying agent, cycloaliphatic tackifying agent, aromatic-modified cycloaliphatic tackifying agent, and combinations thereof, a liquid butene component selected from the group consisting of polyisobutylene, polyisobutene, polybutene, and combinations thereof, and optionally a second rosin-based tackifying agent.

20 Claims, No Drawings

MOISTURE CURABLE HOT MELT SEALANT COMPOSITION INCLUDING SILANE FUNCTIONAL POLYURETHANE

This application claims the benefit of U.S. Provisional Application No. 62/755,053 filed Nov. 2, 2018, which is incorporated herein.

BACKGROUND

The invention is directed moisture curable hot melt sealant compositions.

Sealant compositions used in the construction of windows and insulating glass units are often moisture curable and based on polyurethane prepolymers or silane-modified amorphous polyalphaolefins. Some commercially available polyurethanes sealants also include isocyanate monomer.

Existing silane-modified amorphous polyalphaolefin-based sealant compositions tend to have lower tensile strength and slower curing profiles as compared to polyurethane-based sealants.

There is a need for a moisture curable sealant composition that exhibits good initial green strength, a relatively faster curing profile, and is free of isocyanate monomer.

SUMMARY

In one aspect, the invention features a moisture curable hot melt sealant composition that includes from 1% by weight to no greater than 12% by weight of a silane-functional polyurethane that is free of isocyanate groups, at least 10% by weight of a thermoplastic elastomer having a weight average molecular weight of at least 100,000 grams per mole (g/mol) and being derived from 0% by weight to no greater than 30% by weight styrene, based on the weight of the thermoplastic elastomer, the thermoplastic elastomer being selected from the group consisting of butyl rubber, polyisobutylene rubber, ethylene-propylene rubber, ethylene-propylene diene rubber, thermoplastic polyolefin elastomer, styrene block copolymer, and combinations thereof, at least 10% by weight of a first tackifying agent that includes from 0% by weight to less than 15% by weight aromaticity based on the weight of the first tackifying agent, the first tackifying agent being selected from the group consisting of aliphatic tackifying agent, aromatic-modified aliphatic tackifying agent, cycloaliphatic tackifying agent, aromatic-modified cycloaliphatic tackifying agent, and combinations thereof, a second rosin-based tackifying agent, and a liquid butene component selected from the group consisting of polyisobutylene, polyisobutene, polybutene, and combinations thereof. In one embodiment, the sealant composition further includes a thermoplastic polyalphaolefin having a weight average molecular weight less than 100,000 g/mol, the thermoplastic polyalphaolefin being selected from the group consisting of silane functional amorphous polyalphaolefin, amorphous polyalphaolefin, and combinations thereof. In one embodiment, the sealant composition includes at least 10% by weight of a thermoplastic polyalphaolefin selected from the group consisting of silane functional amorphous polyalphaolefin, amorphous polyalphaolefin, and combinations thereof.

In some embodiments, the sealant composition includes from 2% by weight to 30% by weight of the liquid butene component.

In some embodiments, the thermoplastic elastomer includes butyl rubber. In one embodiment, the sealant composition includes at least 10% by weight butyl rubber.

In other embodiments, the sealant composition further includes filler. In one embodiment, the filler includes talc.

In another embodiment, the thermoplastic elastomer includes the styrene block copolymer and the styrene block copolymer is selected from the group consisting of styrene-butadiene-styrene, styrene-isoprene-styrene, styrene-ethylene/propylene-styrene, styrene-ethylene/butene-styrene block copolymer, and combinations thereof.

In another embodiment, the first tackifying agent exhibits a softening point of at least 100° C.

In some embodiments, the sealant composition includes at least 10% by weight silane functional amorphous polyalphaolefin having a weight average molecular weight less than 100,000 g/mol. In some embodiments, the sealant composition includes from at least 10% by weight to 30% by weight silane functional amorphous polyalphaolefin having a weight average molecular weight less than 100,000 g/mol.

In one embodiment, the sealant composition includes from 1% by weight to 10% by weight of the silane functional polyurethane, from 10% by weight to 30% by weight of the thermoplastic elastomer, and no greater than 40% by weight tackifying resin.

In other embodiments, the sealant composition includes from 1% by weight to 10% by weight of the silane functional polyurethane, from 10% by weight to 30% by weight of the thermoplastic elastomer, and from 10% by weight to 25% by weight of the first tackifying resin.

In another embodiment, the sealant composition includes from 1% by weight to 10% by weight of the silane functional polyurethane, from 10% by weight to 30% by weight of the thermoplastic elastomer, from 10% by weight to 25% by weight of the first tackifying resin, and from 5% by weight to 20% by weight of the second rosin-based tackifying agent.

In one embodiment, the sealant composition further includes at least 5% by weight amorphous polyalphaolefin. In other embodiments, the sealant composition further includes from 10% by weight to 30% by weight silane functional amorphous polyalphaolefin.

In other embodiments, the sealant composition exhibits a moisture vapor transmission rate of no greater than 25 g/m²/day.

In some embodiments, the sealant composition exhibits at least 100% elongation.

In one embodiment, the sealant composition exhibits a shear adhesion failure temperature of at least 70° C.

In another embodiment, the sealant composition exhibits a 60° C. dead load of at least 200 minutes.

In some embodiments, the sealant composition exhibits a peel strength of at least 20 pounds per linear inch (pli) when tested according to the 180 Degree Peel Adhesion test method using a glass substrate and a black line stainless steel substrate.

In one embodiment, the sealant composition exhibits a peel strength of at least 50 pli when tested according to the Climbing Drum Peel test method using a glass substrate and a black line stainless steel substrate.

In some embodiments, the sealant composition exhibits a shear adhesion failure temperature of at least 65° C.

In another aspect, the invention features a moisture curable hot melt sealant composition (e.g., a back bedding composition) that includes from 1% by weight to no greater than 10% by weight of a silane-functional polyurethane that is free of isocyanate groups, at least 10% by weight of a thermoplastic elastomer having a weight average molecular weight of at least 100,000 g/mol and being derived from 0% by weight to no greater than 30% by weight styrene, based on the weight of the thermoplastic elastomer, the thermoplastic elastomer being selected from the group consisting of butyl rubber, polyisobutylene rubber, ethylene-propylene rubber, ethylene-propylene diene rubber, thermoplastic polyolefin elastomer, styrene block copolymer, and combinations thereof, at least 10% by weight of a first tackifying agent that includes from 0% by weight to less than 15% by weight aromaticity based on the weight of the first tackifying agent, the first tackifying agent being selected from the group consisting of aliphatic tackifying agent, aromatic-modified aliphatic tackifying agent, cycloaliphatic tackifying agent, aromatic-modified cycloaliphatic tackifying agent, and combinations thereof, and a liquid butene component selected from the group consisting of polyisobutylene, polyisobutene, polybutene, and combinations thereof.

In another embodiment, the sealant composition (e.g., the back bedding composition) exhibits a peel strength to polyvinyl chloride of at least 12 pli when tested according to the 180 Degree Peel Adhesion test method using a polyvinyl chloride substrate and a 30 mesh steel screen substrate.

In other embodiments, the sealant composition (e.g., the back bedding composition) exhibits a peel strength to polyvinyl chloride of at least 20 pli when tested according to the 180 Degree Peel Adhesion test method using a polyvinyl chloride substrate and a 30 mesh steel screen substrate.

In one embodiment, the sealant composition (e.g., the back bedding composition) exhibits a peel strength of at least 20 pli to a polar substrate having a surface energy greater than 32 dynes/cm when tested according to the 180 Degree Peel Adhesion test method using a glass substrate and a polar substrate having a surface energy greater than 32 dynes/cm.

In other aspects, the invention features an insulating glass unit that includes a first pane of glass, a second pane of glass, a spacer disposed between the first pane of glass and the second pane of glass, and a sealant composition disclosed herein in contact with the first pane of glass, the second pane of glass, and the spacer.

In another aspect, the invention features a window that includes an insulating glass unit, a frame, and a sealant composition disclosed herein in contact with the insulating glass unit and the frame. In one embodiment, the insulting glass unit of the window includes a first pane of glass, a second pane of glass, a spacer disposed between the first pane of glass and the second pane of glass, and a sealant composition in contact with the first pane of glass, the second pane of glass, and the spacer, wherein the sealant composition includes a sealant composition disclosed herein.

The invention features a hot melt moisture curable sealant composition that exhibits good green strength and good adhesion and is free of isocyanate groups.

Other features and advantages will be apparent from the following description of the preferred embodiments and from the claims.

GLOSSARY

In reference to the invention, these terms have the meanings set forth below:

The term "butene component" means polybutene, polyisobutene, polyisobutylene, and combinations thereof.

The term "liquid butene component" means a butene component that is liquid at room temperature.

The term "room temperature" means an ambient temperature of from 20° C. to 25° C.

DETAILED DESCRIPTION

The hot melt moisture curable sealant composition includes a silane modified polyurethane that is free of isocyanate groups, a thermoplastic elastomer, a first tackifying agent, a second rosin ester tackifying agent, and a liquid butene component.

The sealant composition exhibits a peel adhesion of at least 30 pounds per linear inch (pli), at least 40 pli, at least 50 pli, at least 55 pli, at least 60 pli, at least 65 pli, or even at least 70 pli in when tested according to the Climbing Drum Peel Test Method: Glass to Aluminum or even the Climbing Drum Peel Test Method: Glass to Black Line Stainless Steel.

The sealant composition preferably exhibits a green strength (which is also referred to herein as an initial lap shear) of at least 20 pounds per square inch (psi), or even at least 25 psi, and a 30 day lap shear of at least 40 psi, at least 50 psi, or even at least 60 psi as measured according to the room temperature lap shear test method.

The sealant composition also preferably exhibits a Room Temperature Five Pound Dead Load of greater than 1440 minutes (min) after 24 hours.

The sealant composition preferably exhibits a 60° C. Heated One Pound Dead Load of at least 200 min, at least 300 min, or even at least 400 min.

The sealant composition exhibits a maximum tensile strength of at least 80 psi, at least 120 psi, or even at least 180 psi after 24 hours or even after 30 days, and an elongation of at least 100%, at least 300%, at least 600% or even at least 800% after 24 hours or even after 30 days.

The sealant composition preferably exhibits a Shear Adhesion Failure Temperature (SAFT) of at least 60° C., at least 70° C. or even at least 80° C.

The sealant composition passes the Glass Bond Adhesion Test Method when tested at room temperature and according to the water soak condition.

When formulating the sealant composition for use in insulating glass units, the sealant composition can be formulated to exhibit a Moisture Vapor Transmission Rate (MVTR) of no greater than 25 grams per square meter per day (g/m$^2$/day), no greater than 20 g/m$^2$/day, or even no greater than 10 g/m$^2$/day at 37.8° C. and 98% humidity as tested according to the MVTR Test Method.

The sealant composition also exhibits good adhesion to polar substrates having a surface energy greater than 32 dynes/cm including such polar substrates as polyvinyl chloride, and acrylic coated metal substrates (e.g., acrylic coated steel (e.g., black line stainless steel) and acrylic coated aluminum). Preferably the sealant composition exhibits a 180 degree peel strength to a polar substrate having a surface energy greater than 32 dynes/cm of at least 20 pli, at least 30 pli, or even at least 40 pli when tested according to the 180 Degree Peel Adhesion Test Method.

The composition cures upon exposure to moisture, and preferably is stored under nitrogen in a tightly closed container to prevent curing prior to use.

Silane Polyurethane Polymer

The silane polyurethane polymer is liquid at room temperature (i.e., from 22° C. to 25° C.) and preferably exhibits a viscosity of no greater than 60,000 cP, no greater than 40,000 cP, or even from 10,000 cP to 60,000 cP at 25° C. The silane polyurethane polymer is free of isocyanate groups and includes pendant silyl groups that are positioned laterally, terminally, or a combination thereof, to the polymer backbone. The silyl groups include at least one alkoxy group. The silane polyurethane polymer can be derived from a variety of components including, e.g., active hydrogen organofunctional silane, polyol, isocyanate (e.g., silane functional isocyanate), and various combinations thereof. Multiple different silane polyurethanes can be present in the sealant composition and can be differ from one another in at least one property including, e.g., molecular weight, viscosity, number of functional groups, type of functional groups, location of functional groups, composition, and combinations thereof.

Useful commercially available silane polyurethane polymers include, e.g., silane functional polyurethanes derived from polyether polyols available under the POLYMER ST series of trade designations including, e.g., POLYMER ST 80 trimethoxy silane modified polyurethane polymer having a backbone derived from polypropylene glycol and polyurethane and a viscosity of 20,000 at 25° C., POLYMER ST 81 trimethoxy silane modified polyurethane polymer having a backbone derived from polypropylene glycol and polyurethane and a viscosity of 40,000 at 25° C., POLYMER ST 77 trimethoxy silane modified polyurethane polymer having a backbone derived from polypropylene glycol and polyurethane and a viscosity of 40,000 at 25° C., POLYMER ST 61 trimethoxy silane modified polyurethane polymer having a backbone derived from polypropylene glycol and polyurethane and a viscosity of 35,000 at 25° C., POLYMER ST 60, and POLYMER ST 48, all of which are available from Evonik Industries AG (Germany) and the properties of which are as reported by the manufacturer.

The sealant composition includes no greater than 20% by weight, no greater than 15% by weight, no greater than 10% by weight, at least 2% by weight, at least 4% by weight, from 2% by weight to 20% by weight, or even from 2% by weight to 15% by weight silane polyurethane polymer.

Thermoplastic Elastomer

Useful thermoplastic elastomers include butyl rubber, polyisobutylene rubber, EPDM (ethylene-propylene-diene) rubber, polyolefin elastomers, block copolymer elastomers, styrene block copolymer elastomers, and combinations thereof. The thermoplastic elastomer has a weight average molecular weight of at least 100,000 g/mol, or even from 150,000 g/mol to 400,000 g/mol.

Useful butyl rubbers are commercially available in a variety of grades from ExxonMobil Chemical Corporation (Houston, Tex.) including, e.g., 065, 066, 165, 268, 365, and 395 butyl rubbers, from Lanxess Deutschland GmbH (Germany) including e.g., RB100, RB101, RB301, and RB 402 butyl rubbers, and from United Chemical Products (Russia) including BK-1657N butyl rubber.

Useful polyisobutylene rubbers are commercially available under a variety of trade designations including, e.g., under the OPPANOL series of trade designations from BASF Corporation (Florham, N.J.) including, e.g., OPPANOL B100 having a Mw of 1550 kg/mol and OPPANOL B150 having a Mw of 3050 kg/mol.

Useful EPDM rubbers are commercially available under a variety of trade designations including, e.g., under the VISTALON series of trade designations from ExxonMobil including VISTALON 6602, and under the KELTON series of trade designations from Lanxess Deutschland GmbH (Germany) including KELTON 2450 EPDM rubber.

Useful polyolefin elastomers include copolymers and terpolymers derived from aliphatic mono-1-olefin (alpha olefin) monomers having from 2 to 10 carbon atoms including, e.g., ethylene-hexene, ethylene-octene, ethylene-butene, propylene-ethylene, propylene-butene, propylene-octene copolymers, and combinations thereof. Useful polyolefin elastomers are commercially available under a variety of trade designations including, e.g., under the VISTAMAXX series of trade designations from ExxonMobil Chemical Company (Houston, Tex.) including, e.g., VISTAMAXX 6102 propylene-ethylene copolymer and VISTAMAXX 6202 propylene-ethylene copolymer, under the EXACT series of trade designations from ExxonMobil, under the ENGAGE series of trade designations from Dow Chemical Co. (Midland, Mich.) including ENGAGE 8407, and under the VESTOPLAST series of trade designations from Evonik Degussa GmbH (Cologne, Germany) including, e.g., VESTOPLAST 888 propylene-ethylene copolymer.

Useful styrene block copolymer elastomers include no greater than 30% by weight, no greater than 20% by weight, no greater than 15% by weight, from 5% by weight to no greater than 15% by weight, from 5% by weight to 15% by weight, or even from 5% by weight to 10% by weight styrene based on the weight of the elastomer. Useful styrene block copolymers have at least one A block that includes styrene and at least one B block that includes, e.g., elastomeric conjugated dienes (e.g., hydrogenated and unhydrogenated conjugated dienes), sesquiterpenes (e.g., hydrogenated and nonhydrogenated sesquiterpenes), and combinations thereof. The A blocks and the B blocks bind to one another in any manner of binding such that the resulting copolymer exhibits a variety of structures including, e.g., random, straight-chained, branched, radial, star, comb, tapered, and combinations thereof. The block copolymer can exhibit any form including, e.g., linear A-B block, linear A-B-A block, linear A-(B-A)$_n$-B multi-block, and radial (A-B)$_n$-Y block where Y is a multivalent compound and n is an integer of at least 3, tetrablock copolymer, e.g., A-B-A-B, and pentablock copolymers having a structure of A-B-A-B-A. The adhesive composition can include blends of at least two different block copolymers.

Suitable styrene A blocks include, e.g., styrene, alpha-methylstyrene, o-methylstyrene, m-methylstyrene, p-methylstyrene, p-tert-butylstyrene, 2,4-dimethylstyrene, 2,4,6-trimethylstyrene, and combinations thereof.

Suitable block elastomeric conjugated diene B blocks include, e.g., butadiene (e.g., polybutadiene), isoprene (e.g., polyisoprene), 2,3-dimethyl-1,3-butadiene, 1,3-pentadiene, 1,3-hexadiene, and combinations thereof, and hydrogenated versions thereof including, e.g., ethylene, propylene, butylene and combinations thereof.

Useful styrene block copolymers include, e.g., styrene diblock copolymers (e.g., styrene-butadiene (SB) and styrene-isoprene block (SI)) styrene-butadiene-styrene (SBS), styrene-isoprene-styrene (SIS), styrene-ethylene-butylene-styrene (SEBS), styrene-ethylene-propylene-styrene (SEPS), styrene-isobutylene-styrene, and combinations thereof.

Useful styrene block copolymer elastomers are commercially available under the KRATON D and G series of trade designations Kraton Corporation, from (Houston, Tex.) including, e.g., KRATON D 1163 SIS and D 1117 SIS, and KRATON G 1652 SEBS, G 1657 SEBS, G 1726 SEBS, and G 1901 SEBS, EUROPRENE Sol T trade designation from EniChem (Houston, Tex.), SEPTON trade designation from Septon Company of America (Pasadena, Tex.) including SEPTON S 1001 SEPS block copolymer, and SEPTON 4030, 4033, 4044, 4055 and 4077 block copolymers, and VECTOR series of trade designations from Taiwan Synthetic Rubber Corporation (TSRC) (Taipei City, Taiwan)

including VECTOR 4211 and VECTOR 4111 styrene-isoprene-styrene block copolymers, and HYBRAR H7125 and H7311 hydrogenated SIS block copolymers from Kuraray America Inc. (Houston, Tex.).

The sealant composition includes from 8% by weight to 50% by weight, from 10% by weight to 40% by weight, from about 10% by weight to 30% by weight, or even from 10% by weight to 20% by weight thermoplastic elastomer.

First Tackifying Agent

The first tackifying agent preferably has a ring and ball softening point of at least 90° C. and includes from 0% by weight to less than 15% aromaticity. Examples of suitable first tackifying agents include aliphatic, cycloaliphatic, aromatic, aliphatic-aromatic, aromatic modified alicyclic, and alicyclic hydrocarbon resins and modified versions and hydrogenated derivatives thereof, and combinations thereof.

Suitable tackifying agents are commercially available under a variety of trade designations including, e.g., partially hydrogenated aromatic modified petroleum hydrocarbon resins available under the ESCOREZ series of trade designations from ExxonMobil including, e.g., ESCOREZ 5615 cycloaliphatic resin having 9.9% aromaticity and a softening point of 117.8° C., ESCOREZ 5600 cycloaliphatic hydrocarbon resin having a softening point of 102.5° C. and 9.8% aromaticity, and ESCOREZ 5637 cycloaliphatic hydrocarbon resin having a softening point of 129.5° C. and 5.2% aromaticity, partially hydrogenated cycloaliphatic petroleum hydrocarbon resins commercially available under the EASTOTAC series of trade designations from Eastman Chemical Co. (Kingsport, Tenn.) including, e.g., EASTOTAC H-100, H-115, H-130 and H-142 partially hydrogenated cycloaliphatic petroleum hydrocarbon resins, which are available in grades E, R, L and W, which have differing levels of hydrogenation from the least hydrogenated (E) to the most hydrogenated (W), aliphatic-aromatic petroleum hydrocarbon resins available under the WINGTACK EXTRA trade designation from Cray Valley, and aromatic hydrogenated hydrocarbon resins available under the REGALREZ 1094 trade designation also from Eastman Chemical Co.

The sealant composition includes at least 10% by weight, no greater than 40% by weight, no greater than 30% by weight, no greater than 25% by weight, at least 7% by weight, at least 10% by weight, from 10% by weight to 30% by weight, or even from 10% by weight to 25% by weight of the first tackifying agent(s).

Rosin-Based Tackifying Agent

Useful rosin-based tackifying agents have an acid number no greater than 15 and include, e.g., rosin ester tackifying agents (e.g., tall oil rosins (e.g., pentacrythritol ester of tall oil rosin), glycerol and pentaerythritol esters of natural and modified rosins (e.g., glycerol esters of pale, wood rosin, glycerol esters of gum rosin, glycerol esters of hydrogenated rosin, glycerol esters of polymerized rosin, glycerol esters of dimerized rosin, pentaerythritol esters of hydrogenated rosin, and phenolic-modified pentaerythritol esters of rosin), and combinations thereof), rosin acid tackifying agents (e.g., natural and modified rosins including, e.g., gum rosin, wood rosin, tall oil rosin, distilled rosin, hydrogenated rosin, dimerized rosin, and combinations thereof), polymerized rosins, and combinations thereof.

The rosin-based tackifying agent preferably exhibits a softening point of at least 90° C.

Suitable commercially available rosin ester tackifying agents are available under a variety of trade designations including, e.g., under the SYLVALITE series of trade designations from Kraton Corporation (Jacksonville, Fla.) including SYLVALITE RE 100L, SYLVALITE RE 110L, and SYLVALITE RE 15L pentaerythritol ester of tall oil rosin tackifying agents.

The sealant composition includes at least 2% by weight, at least 5% by weight, at least 10% by weight, no greater than 40% by weight, no greater than 15% by weight, from 5% by weight to 40% by weight, from 10% by weight to 40% by weight, from 10% by weight to 30% by weight, or even from 15% by weight to 35% by weight rosin-based tackifying agent.

The total amount of tackifying agent in the sealant composition (e.g., the sum of first tackifying agent and rosin ester tackifying agent) preferably is no greater than 40% by weight.

Liquid Butene Component

The liquid butene component is a polybutene, polyisobutene, polyisobutylene, or a combination thereof. The liquid butene component is a liquid at room temperature and exhibits finger tack (i.e., is tacky to the touch).

Useful liquid butene components are commercially available under a variety of trade designations including, e.g., under the OPPANOL series of trade designations from BASF Corporation (Florham, N.J.) including, e.g., OPPANOL B15 polyisobutene having a Mw of 108,000, and OPPANOL B12 polyisobutene having a Mw of 70,000, and the INDOPOL series of trade designations from Ineos USA LLC (League City, Tex.) including INDOPOL H-1900 having a number average molecular weight (Mn) of 2500, H-100 having a Mn of 910 and H-300 having an Mn of 1300, and the TETRAX series of trade designations from JXTG Nippon Oil and Energy Corp., (Tokyo, Japan) including TETRAX 5T polyisobutylene having a Mw of 69,000 g/mol and TETRAX 4T polyisobutylene.

The sealant composition includes no greater than 35% by weight, no greater than 27% by weight, at least 2% by weight, at least 10% by weight, from 2% by weight to 30% by weight, from 2% by weight to 20% by weight, from 2% by weight to 15% by weight, or even from 2% by weight to 10% by weight of the liquid butene component.

Thermoplastic Polyalphaolefin

The moisture curable composition optionally includes a thermoplastic polyalphaolefin having a Mw less than 100,000 g/mole, no greater than 70,000 g/mol g/mole, or even no greater than 50,000 g/mol and a Brookfield viscosity no greater than 60,000 cP, no greater than 25,000 cP, no greater than 10,000 cP, no greater than 5000 cP, no greater than 4000 cP, at least 1500 cP, from 1000 to 8000 cP, from 1500 cP to 8000 cP, or even from 1500 cP to 4000 cP at 190° C. Useful thermoplastic polyalphaolefins include, e.g., amorphous polyalphaolefins, semi-crystalline polyalphaolefins (e.g., metallocene-catalyzed polyalphaolefins), silane functional polyalphaolefins, silane functional semi-crystalline polyalphaolefins, and combinations thereof.

Useful amorphous polyalphaolefins include homopolymers, copolymers, terpolymers and combinations thereof. The amorphous polyalphaolefins can be a random copolymer or a block copolymer. The amorphous polyalphaolefins can be derived from a variety of monomers including, e.g., propylene, 1-butene, 1-pentene, 3-methyl-1-butene, 1-hexene, 3-methyl-1-pentene, 4-methyl-1-pentene, 3-ethyl-1-pentene, 1-octene, 1-decene, 1-undecene and combinations thereof.

Useful amorphous polyalphaolefins (APAOs) are commercially available under the REXTAC series of trade designations from Rextac LLC (Odessa, Tex.) and include REXTAC RT2730 butene-1 copolymer having a viscosity of 3000 cP at 190° C., REXTAC RT2535 ethylene copolymer having a viscosity of 3500 cP at 190° C., and REXTAC RT2780 butene-1 copolymer having a viscosity of 8000 cP at 190° C., under the VESTOPLAST series of trade designations from Evonik Degussa GmbH (Cologne, Germany) and include, e.g., VESTOPLAST 703 propene-rich APAO having a Mw of 34,000 g/mol, VESTOPLAST 704 propene-rich APAO having a Mw of 35,000 g/mol, and VESTOPLAST 708 propene-rich APAO having a Mw of 75,000 g/mol, VESTOPLAST 308, VESTOPLAST 408, VESTOPLAST 508 and VESTOPLAST 608 and under the EASTOFLEX series of trade designations from Eastman Chemical Co. (Kingsport, Tenn.) and include, e.g., EASTOFLEX M1025 polypropylene-propylene-ethylene copolymer mixture having a viscosity of 2500 cP at 190° C., EASTOFLEX M1030 polypropylene-propylene-ethylene copolymer mixture having a viscosity of 3000 cP at 190° C., EASTOFLEX M1058 polypropylene-propylene-ethylene copolymer mixture having a viscosity of 5800 cP at 190° C., EASTOFLEX M1060 amorphous polypropylene-ethylene copolymer having a viscosity of 6000 cP at 190° C., and EASTOFLEX M2030 amorphous polypropylene-ethylene copolymer having a viscosity of 3000 cP at 190° C.

The optional polyalphaolefin can present in the composition in an amount of from 0% by weight to 50% by weight, from 5% by weight to 50% by weight, from 10% by weight to 40% by weight, or even from 15% by weight to 45% by weight.

Useful silane functional amorphous polyalphaolefins are commercially available under the VESTOPLAST series of trade designations from Evonik Degussa GmbH (Cologne, Germany) including, e.g., VESTOPLAST 206 and VESTOPLAST 2412 silane functional amorphous polyalphaolefinms. Useful silane functional metallocene catalyzed polyolefins are commercially available under the LICOCENE series of trade designations from Clariant AG (Muttenz, Switzerland) and include LICOCENE PE SI 3361 TP and LICOCENE PP.

The optional silane functional polyolefin can be present in the composition in an amount of from 0% by weight to 50% by weight, from 5% by weight to 50% by weight, from 10% by weight to 40% by weight, from 10% by weight to 30% by weight, or even from 15% by weight to 45% by weight.

Additional Components

The sealant composition optionally includes other additives including, e.g., filler, antioxidants, catalysts, adhesion promoters, plasticizers, thermal stabilizers, optical brighteners, rheology modifiers, corrosion inhibitors, flame retardants, and combinations thereof.

Useful fillers include, e.g., talc, fumed silica, precipitated silica, aluminum silicates, nanopowders, carbon black, calcium carbonate, and combinations thereof. Suitable fillers are commercially available under a variety of trade designations including, e.g., under the MISTRON series of trade designations from Imerys Talc America (Three Forks, Mont.) including MISTRON VAPOR R microcrystalline talc.

The sealant composition optionally includes less than 40% by weight, less than 30% by weight, from 0% by weight to 30% by weight, from 0.1% by weight to 30% by weight, or even from 10% by weight to 30% by weight filler.

Useful antioxidants include, e.g., antioxidants available under the TINUVIN series of trade designations including, e.g., TINUVIN 770 and TINUVIN 328 and under the IRGANOX series of trade designations including e.g., IRGANOX 1010 all of which are available from CIBA Specialty Chemicals Corp. (Tarrytown, N.Y.). The antioxidant can be present in the composition in an amount of from 0% by weight to 3% by weight, from 0.1% by weight to 2% by weight, or even from 0.2% by weight to 1% by weight.

A catalyst is optionally added to the composition to increase the rate of crosslinking. Useful catalysts include, e.g., organotin compounds including, e.g., dialkyl tin dicarboxylates (e.g., dibutyl tin dilaurate and dibutyl tin diacetate), tin carboxylates, stannous salts of carboxylic acids (e.g., stannous octoate and stannous acetate), tetrabutyl dioleatodistannoxane, colorless organic titanates (e.g., VERTEC TIPT and VERTEC IPTH from Johnson Matthey Catalysts, England), organosilicon titantates, alkyltitantates, and metal alkoxides (e.g., aluminum isopropoxide and zirconium isopropoxide), and combinations thereof. The catalyst can be added either in pure form or, for greater ease of metering, in the form of a master batch that includes the amorphous polyalphaolefin. The catalyst can be present in the composition in an amount of from 0% by weight to 5% by weight, 0.001% by weight to 5% by weight from 0.005% by weight to 1% by weight, or even from 0.01% by weight to 0.5% by weight.

The composition optionally includes a silane adhesion promoter. One example of a suitable class of silane adhesion promoters is alkoxy silane functional polyether polymers including triethoxysilane functional polyether polymers and trimethoxysilane functional polyether polymers. Alkoxy silane functional polyether polymers are commercially available under the TEGOPAC and DYNASYLAN series of trade designations from Evonik and include TEGOPAC SEAL 100 triethoxy silane functional polyether polymer having a backbone derived from polypropylene glycol and a viscosity of greater than 40,000 at 25° C., TEGOPAC BOND 150 triethoxy silane functional polyether polymer having a backbone derived from polypropylene glycol and a viscosity of greater than 40,000 at 25° C., TEGOPAC BOND 251 triethoxy silane functional polyether polymer having a viscosity of 35,000 at 25° C., DYNASYLAN 1146 oligomeric diaminofunctional-silane, and DYNASYLAN SIVO 210, 214 and 202 multifunctional aminosilanes, and under the SILQUEST series of trade designations from Momentive Performance Materials Inc. (Waterford, N.Y.) including, e.g., SILQUEST A-Links 597 trimethoxysilyl isocyanurate. Another example of a suitable class of adhesion promoters is silane-containing coupling agents a suitable example of which is 3-glycidyloxypropyl trialkoxysilane. The silane adhesion promoter can be present in the composition in an amount of from 0% by weight to 5% by weight, from 0.2% by weight to 2% by weight, or even from 0.4% by weight to 1% by weight.

Uses

The sealant composition can be used to bond a variety of substrates to one another including, e.g., glass, metal, aluminum, stainless steel, fiberglass composites, vinyl, polyvinyl chloride, polymer (e.g., polypropylene), wood (e.g., pressed wood composites, which optionally include polymer), and combinations thereof. The composition is particularly useful for bonding glass to various substrates including, e.g., other glass substrates, polymer substrates (e.g., acrylic substrates), metallic substrates, wood substrates (e.g., wood composites), spacers (e.g., thermoplastic spacers), and combinations thereof. The composition can be used in a variety of constructions including, e.g., insulating glass units, sash frame assemblies, automotive and molding applications, windows, doors, walls, and constructions that require good adhesion to glass, metal, plastic and combinations thereof.

The composition can be used in a variety of applications including, e.g., single seal applications, dual seal applications, back bedding, gasketing, perimeter sealing, as a moisture vapor barrier, laminating, and combinations thereof.

In back bedding, the composition is used to bond an insulating glass assembly, e.g., insulating glass units and sash assemblies, to a frame. Back bedding is discussed in more detail in U.S. Pat. Nos. 8,637,605, 6,286,288 and 5,856,404, which are incorporated herein. An additional hot melt moisture curable sealant composition useful as a back bedding sealant composition includes a silane modified polyurethane that is free of isocyanate groups, a thermoplastic elastomer, a tackifying agent, and a liquid butene component. Useful silane modified polyurethanes that are free of isocyanate groups, thermoplastic elastomers, tackifying agents, and liquid butene components, and suitable amounts thereof, for this additional back bedding sealant composition are the same as those set forth above. The tackifying agent for this additional back bedding sealant composition can be the first tackifying agent, the second rosin-based tackifying agent, or a combination thereof. A rosin-based tackifying agent is optional in this back bedding sealant composition.

The additional back bedding sealant composition preferably exhibits good adhesion to polar substrates having a surface energy greater than 32 dynes/cm including such polar substrates as polyvinyl chloride, and acrylic coated metal substrates (e.g., acrylic coated steel (e.g., black line stainless steel) and acrylic coated aluminum). The back bedding sealant composition preferably exhibits a 180 degree peel strength to a polar substrate having a surface energy greater than 32 dynes/cm of at least 12 pli, at least 20 pli, at least 30 pli, or even at least 40 pli. The back bedding sealant composition preferably exhibits a 180 degree peel strength of at least 20 pli, at least 30 pli, or even at least 40 pli when tested according to the 180 Degree Peel Adhesion Test Method using the glass substrate and the black line stainless steel substrate, or a 180 degree peel strength at least 12 pli, at least 20 pli, at least 30 pli, or even at least 40 pli when tested according to the 180 Degree Peel Adhesion Test Method using the PVC substrate and the 30 mesh steel screen.

In one useful dual seal application, the composition contacts a first pane of glass, a second pane of glass, a spacer, and a primary sealant.

The moisture curable composition can be applied using a wide variety of application techniques including, e.g., linear extruder, hand gun, other forms of extruder beads, and combinations thereof. The substrates are subsequently joined to one another within the open time of the applied composition, the duration of which depends on the composition of the applied mixture.

The invention will now be described by way of the following examples. All parts, ratios, percentages and amounts stated in the Examples are by weight unless otherwise specified.

EXAMPLES

Test Procedures

Test procedures used in the examples include the following. All ratios and percentages are by weight unless otherwise indicated. The procedures are conducted at room temperature (i.e., an ambient temperature of from about 20° C. to about 25° C.) unless otherwise specified.

Aromaticity Test Method

The percentage of aromaticity in a tackifying agent is determined by the manufacture and is reported as determined according to ExxonMobil Test Method ETM 22-50.

Melt Flow Rate

Melt flow rate is determined as follows. Prepare a 60 mil film of sample composition. Cut 1"×7" test specimens from the film after the film has cooled. The samples (minus the release paper) must weigh 6 to 8 grams. (The exact weight is not a quality critical measurement.) Reduce or increase the sample size until the sample weights 6 to 8 grams. Heat the melt flow index apparatus having a 2.095 mm orifice to 190° C. Set the apparatus to the procedure required to obtain an accurate result. Fold the strip of sample lengthwise twice so that it is ¼ the original width. Charge the cylinder of the apparatus with the sample. Attach a 1 inch timer actuating strip. Allow the sample to preheat for from 4 minutes to 5 minutes. Record the number of seconds elapsed on the automatic timer and calculate the actual melt flow rate time by subtracting 60 seconds. The melt flow rate is reported in seconds.

Molecular Weight Determination by Size Exclusion Chromatography:

Approximately 0.05 g of sample is dissolved in 10 milliliters (mL) of a suitable solvent. The sample solubility is examined to confirm that the sample has dissolved and, if necessary, is filtered through a 0.45 μm polytetrafluoroether (PTFE) filter to yield a clear, colorless solution. The resultant solution is analyzed by size exclusion chromatography (SEC) using the same solvent to dissolve the sample as the eluent, three SEC columns, and a refractive index (RI) detector. The retention volumes are calibrated to EASICAL 10 point polystyrene standards having molecular weights ranging from 580 grams per mole (g/mol) to 6,870,000 g/mol. The Mark-Houwink parameters for all samples are K=15.2 and alpha=0.75. No correction for polymer conformation is made.

Moisture Vapor Transmission (MVTR) Test Method

The permeability coefficient (MVTR) is determined according to ASTM F1249-90 entitled, "Standard Test Method for Water Vapor Transmission Rate." The test is conducted at approximately 37.8° C. and 90% relative humidity on a sample in the form of a film having a thickness of from 60 mil to 80 mil.

Room Temperature Lap Shear Test Method

The lap shear strength is determined according to ASTM C-961-01 entitled, "Standard Test Method for Lap Shear Strength of Hot Applied Sealants," with the exception that the test specimens are prepared as follows. A homogeneous film of the sealant composition is pressed at 100° C. to a thickness of 60 mil between two pieces of release paper. After the film has cooled, 1 in by 1 in samples are cut from the film. Aluminum strips, 1 in by 4 in, are wiped with toluene and allowed to dry. The release paper on one side of the sample of sealant film is removed and then the sample of sealant is placed on one end of a cleaned aluminum strip. The release paper on the second side of the sample of sealant film is then removed and two paperclip shims are placed in the center of sealant, parallel to the 1 in width of the aluminum strip. A second aluminum strip is placed on top of the sealant and paper clip shims such that the aluminum strips overlap by 1 inch covering the 1 inch square of the sealant film to produce the test specimen.

The test specimens are then heated in an oven at a temperature and for a duration sufficient to enable the film to melt. Useful temperatures and times have been found to be from about 150° C. to about 160° C. for from 5 to 10 minutes.

The specimens are then removed from the oven and the aluminum substrate is immediately pressed into the sealant using a tongue depressor until the metal strips touch the shims. The test specimens are then allowed to cool overnight at 23° C. and 50% humidity.

The test specimens are then tested in the shear mode on an Instron tester with a crosshead speed of 1 in per minute. The average shear strength is recorded in psi (MPa).

Initial lap shear strength (i.e., green strength) is measured 24 hours after preparing the lap shear bond test specimens.

30 day lap shear strength is measured after conditioning the bonds at 23° C. and 50% humidity in a controlled environment for 30 days.

60° C. Heated One Pound Dead Load Test Method

Test specimens are prepared according to the Lap Shear Test Method.

The test specimens are conditioned at 23° C. and 50% humidity in a controlled environment for 30 days. A test specimen is placed in a temperature-controlled oven at 60° C.+/−2° C. and a 500 g weight is attached to the bottom of each test specimen. A timer is started. When the sample fails, the time to failure is recorded in days, hours and minutes. At least five samples are tested and the average value is reported. If any sample deviates from the average value by more than 25%, it is not used to calculate the average, and if two or more values deviate from the average value by more than 25%, the test is re-run on new samples.

Room Temperature Five Pound Dead Load Test Method

Test specimens are prepared according to the Lap Shear Test Method.

The test is started 24 hours after the test specimens are pressed together. The upper portion of each test specimen is attached to a clip or other device that can attach the test specimen to a stationary location. A 5 pound weight is then attached to the bottom portion of each test specimen. The test specimens are observed for 24 hours and the time at which the substrates are completely separated is recorded in hours. If a test specimen does not fail after 24 hours, the test is stopped and the failure time is recorded as greater than 24 hour (i.e., 1440 minutes).

Shear Adhesion Failure Temperature (SAFT) Test Method

Test specimens are prepared according to the Lap Shear Test Method.

The test specimens are conditioned at 23° C. and 50% humidity in a controlled environment for 30 days. The test specimens are then suspended in a forced air oven programmed to increase at a rate of 25° C. per hour from room temperature to 175° C., by firmly affixing one end from the specimen to a support in the oven capable of suspending a 1 in wide film in shear mode. A 500 gram weight is suspended from the bottom end of the test specimen and allowed to hang freely. The oven program is started. The temperature at which a sample test specimen delaminates is recorded to the nearest degree Celsius (C).

The average temperature of three samples is reported to the nearest degree C., as the shear adhesion failure temperature (SAFT).

Tensile Strength and Elongation Test Method

The tensile strength at break and % elongation at break of the sealant composition is determined according to ASTM-D638-00 entitled, "Standard Test Method for Tensile Properties of Plastics." A film of the homogeneous sealant composition is pressed at 100° C. to a thickness of from 60 mil to 80 mil and then conditioned at 23° C. and 50% relative humidity for 30 days to cure. Type IV die dog bone specimens are cut from the conditioned film and tested for maximum tensile strength and % elongation at break using an Instron tensile tester. The results are reported in pounds per square inch (psi) and %, respectively.

Tensile Strength and % Elongation are Measured after 24 Hours and after 30 Days.

Glass Bond Adhesion Test Method

Two pieces of glass 0.18 in by 2 in by 7 in and one 7 in by 0.25 in spacer section are used to make one test specimen. The spacer is positioned between the two glass pieces and in parallel with the edges of the glass so as to form channel, 0.25 in by 7 in, for the sealant to go into. Glass and spacer of the test specimen are clamped together at both ends. The sealant is applied melted using a heated at application temperature extruder with 0.25 in die on the end. The glass is positioned on the die to allow the melted sealant to run into the channel. A minimum of four test specimens are required. The test specimens are allowed to cool overnight.

Room Temperature Condition: two specimens are conditioned at room temperature for one week before testing.

Water Soak Condition: two specimens are condition in water for one week. The test specimens are removed from the water and immediately tested.

The test specimens are tested by slowly pulling the glass substrates away from each other in the direction of a 180 degree plane over a period of approximately 5 seconds.

The percent adhesive failure to glass for each test specimen under each condition is reported. The test specimen is rated a "pass" if there is less than 50% adhesive failure to glass based on the initial area of the adhesive bond.

Climbing Drum Peel Test Method: Glass to Aluminum

A homogeneous film of the sealant composition is pressed at 100° C. to a thickness of 60 mil between to pieces of release paper. After the film has cooled, 1 in by 7 in samples are cut from the film. Aluminum strips 0.025 in by 1 in by 12 in are wiped with toluene and allowed to dry. A clear glass substrate, 9 in by 3 in by from 0.18 in to 0.25 in, is cleaned with a glass cleaner and thoroughly dried. The release paper on one side of the sample of sealant film is removed and then the sealant film sample is placed on the cleaned glass substrate such that it is centered on the substrate. There should be 1 in of exposed glass substrate on all sides of the sealant strip. The release paper on the second side of the sample of sealant film is then removed and the aluminum strip is placed directly over the sealant so that the metal extends 1.5 in beyond the glass at each end.

The test specimens are then heated in an oven at a temperature and for a duration sufficient to enable the film to soften and to easily squeeze out from the two substrates when the specimens are compressed. Useful temperatures and times have been found to be from 150 OC to 170° C. for from 5 to 10 minutes.

The specimens are then removed from the oven and the aluminum substrate is immediately pressed into the sealant using a tongue depressor until the sealant no longer compresses. The test specimens are then allowed to cool overnight at 23° C. and 50% humidity. Three test specimens are prepared.

The test specimens are then tested according to ASTM D-1781 entitled, "Standard Test Method for Climbing Drum Peel for Adhesives." The maximum, average and minimum peel loads are recorded. The average torque is recorded. The average value of the average peel load, in pounds per linear inch (pli), for all test specimens is recorded. The failure mode (e.g., adhesive failure, cohesive failure, and substrate failure), when applicable, is also recorded. If an individual average peel load deviates by at least 50% from the average value, the data point is not included in the average peel load calculation.

Climbing Drum Peel Test Method: Glass to Black Line Stainless Steel

The Climbing Drum Peel Test Method: Glass to Black Line Stainless Steel Test method is conducted according to the Climbing Drum Peel Test Method: Glass to Aluminum test method with the exception a black line stainless steel strip, 0.01 in by 1 in by 12 in, is used instead of an aluminum strip and the stainless steel strip is cleaned with isopropanol instead of toluene, followed by drying with a paper towel. The term "black line stainless steel" is a term used in the art related to glass constructions for black acrylic painted stainless steel.

180 Degree Peel Adhesion Test Method

Test specimens are prepared as for the AAMA 800 for Back Bedding Glazing Compounds based on ASTM C 794, for adhesion to glass and aluminum panels. Sealant composition is applied in a molten state on the first substrate (e.g., glass or PVC) and a second flexible substrate (e.g., a 1 in×0.01 in black painted thin metal strip (e.g., black line stainless steel) or a 30 mesh steel screen) is bonded to the applied sealant composition. Three test specimens are prepared for each test method.

The test specimens are then allowed to cure at 23° C. and 50% humidity for 30 days.

Peel strength is measured using an Instron tester by pulling the second flexible substrate off of the first substrate at a 180 degree angle. The results are reported in pounds per linear inch (pli). The substrates are observed after the test is conducted and the area on the peeled substrates that is covered with glue is reported as a percentage of the total area of the substrates that had formed the bond. Whether the adhesive bond exhibits adhesive failure (AF) or cohesive failure (CF) is also observed and recorded.

Examples E1, E2 and E4

The sealant composition of Examples E1, E2 and E4 were prepared as follows. All of the butyl rubber, half of the ESCOREZ 5615, the zinc oxide, and 20% of the total amount of talc were added to a sigma blade mixer that had been preheated to 160° C. and then mixed at about 700 rotations per minute (RPM) for about 40 min. Then, the rest of the ESCOREZ 5615, the SYLVALITE 110L, and the IRGANOX 1076 antioxidant were added and mixing continued at 1000 RPM for 20 minutes or until all of the resins were melted. Then the polyisobutylene and the carbon black were added. Then the rest of the talc was added in three increments, with mixing for 1 min after each addition. The composition was then mixed under vacuum for about 30 min and the temperature was dropped to 150° C. Molten VESTOPLAST 206, at a temperature of 135° C., was added and the composition was mixed under vacuum for 20 min. POLYMER ST80 was added and then the composition was mixed under vacuum for 15 min. Catalyst was added and the composition was mixed under vacuum for 5 min. The compositions were then stored in a nitrogen purged tightly closed aluminum container to prevent premature curing prior to testing.

Examples E3

The sealant composition of Example E3 was prepared in a similar manner to Examples E1, E2 and E4 with the following exceptions: the temperature was not dropped to 150° C. after the polyisobutylene, carbon black and talc were added, pre-melted VESTOPLAST 608, at a temperature of 160° C., was added instead of VESTOPLAST 206, when the POLYMER ST 80 was added, the temperature was dropped to 150° C., and no catalyst was added. The composition was then stored in a nitrogen purged tightly closed aluminum container to prevent premature curing prior to testing.

The compositions of Examples E1-E4 were tested according to the Melt Flow Rate, Room Temperature Five Pound Dead Load, 60° C. Heated One Pound Dead Load, Lap Shear, Tensile and % Elongation, Glass Bond Adhesion, and Climbing Drum Peel test methods and the results are set forth in Table 1.

TABLE 1

|  | E1 | E2 | E3 | E4 |
| --- | --- | --- | --- | --- |
| Butyl Rubber[1] | 23.17 | 24.02 | 23.2 | 23.2 |
| ESCOREZ 5615[2] | 11.43 | 12.35 | 11.6 | 11.6 |
| SYLVALITE RE 110 L[3] | 11.43 | 12.35 | 11.6 | 11.6 |
| Microcrystalline Talc | 21.63 | 20.02 | 18.23 | 18.23 |
| VESTOPLAST 206[4] | 23.17 | 20.02 | 0 | 23.2 |
| VESTOPLAST 608[5] | 0 | 0 | 23.2 | 0 |
| Antioxidant + other additives | 2.04 | 2.2 | 2.19 | 2.19 |
| Polyisobutylene[6] | 2.78 | 2.34 | 3.98 | 5.44 |
| ST 80[7] | 4.33 | 6.67 | 6.00 | 4.51 |
| Catalyst | 0.03 | 0.03 | 0.00 | 0.03 |
| Total | 100 | 100 | 100 | 100 |
| Properties |  |  |  |  |
| Melt Flow Rate (seconds) | 22 | 26 | 20 | 13 |
| Green Strength: Room Temperature 5 lb Dead Load (time) | >24 h | >24 h | >24 h | >24 h |
| 60° C. 1 lb Dead Load After 30 days (time) | >24 h | >24 h | 363 min | 240 min |
| Lap Shear at Room Temperature |  |  |  |  |
| 24 hours (psi) | ND | 84.5 | ND | 74 |
| 30 days (psi) | 106 | 100.2 | 77 | 82.4 |
| Maximum Tensile Strength |  |  |  |  |
| 24 hours (psi) | ND | 112 | ND | 118 |
| 30 days (psi) | 179 | 169 | 99 | 130 |

TABLE 1-continued

|  | E1 | E2 | E3 | E4 |
|---|---|---|---|---|
| % Elongation at Break | | | | |
| 24 hours (%) | ND | 319 | ND | 283 |
| 30 days (%) | 140 | 152 | 276 | 202 |
| Glass Bond Performance at Room Temperature | Pass | Pass | Pass | Pass |
| Glass Bond Performance after Water Soak | Pass | Pass | Pass | Pass |
| Climbing Drum Peel: "Black Line" (i.e., painted) Stainless Steel/Glass: Peel Strength (psi)/Failure Mode | ND | ND | 88.42/CF | 71.2/CF |

[1]= TP BTR RB 100 butyl rubber (Lanxess/Arlanxeo)
[2]= ESCOREZ 5615 cycloaliphatic hydrocarbon resin having a softening point of 117.8° C. and 9.9% aromaticity
[3]= SYLVALITE RE 110L pentaerythritol ester of tall oil rosin having a softening point of 107° C.
[4]= VESTOPLAST 206 silane functional polyalphaolefin (Evonik)
[5]= VESTOPLAST 608 amorphous polyalphaolefin (Evonik)
[6]= INDOPOL 1900 liquid polyisobutylene or TPC 1350 polyisobutylene
[7]= EVONIK ST 80 silane functional polyurethane exhibiting a viscosity of 20,000 at 190° C.
CF = cohesive failure Examples E5-E7

The sealant composition of Examples E5-E7 were prepared by combining, with mixing and heat, the ingredients in the amounts (in % by weight) set forth in the Table 2. The compositions were stored in a nitrogen purged tightly closed aluminum container to prevent premature curing prior to testing.

The compositions of Examples E5-E7 were then tested according to the Room Temperature Five Pound Dead Load, SAFT, and 180 Degree Peel Adhesion test methods and the results are set forth in Table 2. The 180 Degree Peel Adhesion test was conducted on the following test specimens: glass bonded to black line painted steel (for Examples E5 and E6), and polyvinyl chloride (PVC) bonded to a 30 mesh steel screen (for Examples E5-E7).

TABLE 2

|  | E5 | E6 | E7 |
|---|---|---|---|
| KRATON G 1657 | 15 | 12 | 10 |
| REGALREZ 1094[8] | 20 | 20 | 25 |
| SYLVALITE 110L | 5 | 8 | 0 |
| INDOPOL 1900 | 14.67 | 25.7 | 19.67 |
| VESTOPLAST 206 | 30 | 0 | 30 |
| REXTAC 2730[9] | 10 | 0 | 10 |
| VESTOPLAST 608 | 0 | 13 | 0 |
| VESTOPLAST 704[10] | 0 | 10 | 0 |
| Polymer ST 80 | 5 | 10 | 5 |
| Antioxidant | 0.3 | 0.3 | 0.3 |
| Catalyst | 0.03 | 0 | 0.03 |
| Adhesion Promoter | 0 | 1 | 0 |
| Total | 100 | 100 | 100 |
| Room Temperature 5 lb Dead Load (time) | >1440 min | ND | ND |
| SALT after curing (° C.) | >80 | >80 | >80 |
| 180 Degree Peel Adhesion to Black Line Stainless Steel/Glass (pli)/Failure Mode | 36.7/100% CF | 30.2/100% CF | * |
| 180 Decree Peel Adhesion to steel mesh screen/PVC (pli)/Failure Mode | 25.8/65% CF | 27.5/75% CF | 22.03/90% CF |

[8]= REGALREZ 1094 hydrocarbon resin (Eastman Chemical Co., Tennessee)
[9]= REXTAC 2730 amorphous butene-1 copolymer having a viscosity of 3000 at 190° C. as reported by the manufacturer (Odessa, Texas)
[10]=VESTOPLAST 704 amorphous propene-rich copolymer having a viscosity of 3500 at 190° C. as reported by the manufacturer (Evonik)
*= Example E7, if tested according to the 180 Degree Peel Adhesion Black Line painted Stainless Steel/glass, is expected to exhibit less than 20 psi and to fail adhesively (AF).

Other embodiments are within the claims. Documents referred to herein are incorporated by reference to the extent they do not conflict.

What is claimed is:

1. A moisture curable hot melt sealant composition comprising:
    from 1% by weight to no greater than 12% by weight of a silane-functional polyurethane that is free of isocyanate groups;
    at least 10% by weight of a thermoplastic elastomer having a weight average molecular weight of at least 100,000 grams per mole (g/mol) and being derived from 0% by weight to no greater than 30% by weight styrene, based on the weight of the thermoplastic elastomer, the thermoplastic elastomer being selected from the group consisting of butyl rubber, polyisobutylene rubber, ethylene-propylene rubber, ethylene-propylene diene rubber, thermoplastic polyolefin elastomer, styrene block copolymer, and combinations thereof;
    at least 10% by weight of a first tackifying agent that includes from 0% by weight to less than 15% by weight aromaticity based on the weight of the first tackifying agent, the first tackifying agent being selected from the group consisting of aliphatic tackifying agent, aromatic-modified aliphatic tackifying agent, cycloaliphatic tackifying agent, aromatic-modified cycloaliphatic tackifying agent, and combinations thereof;
    a second rosin-based tackifying agent; and
    a liquid butene component selected from the group consisting of polyisobutylene, polyisobutene, polybutene, and combinations thereof.

2. The sealant composition of claim 1 further comprising a thermoplastic polyalphaolefin having a weight average molecular weight of less than 100,000 g/mol, the thermoplastic polyalphaolefin being selected from the group consisting of silane functional amorphous polyalphaolefin, amorphous polyalphaolefin, and combinations thereof.

3. The sealant composition of claim 1 comprising from 2% by weight to 30% by weight of the liquid butene component.

4. The sealant composition of claim 1, wherein the thermoplastic elastomer comprises butyl rubber.

5. The sealant composition of claim 1 comprising at least 10% by weight of the butyl rubber.

6. The sealant composition of claim 1 further comprising filler.

7. The sealant composition of claim 6, wherein the filler comprises talc.

8. The sealant composition of claim 1, wherein the thermoplastic elastomer comprises the styrene block copolymer and the styrene block copolymer is selected from the group consisting of styrene-butadiene-styrene, styrene-isoprene-styrene, styrene-ethylene/propylene-styrene, styrene-ethylene/butene-styrene block copolymer, and combinations thereof.

9. The sealant composition of claim 2 comprising at least 10% by weight of the thermoplastic polyalphaolefin.

10. The sealant composition of claim 1 further comprising from 10% by weight to 30% by weight of a thermoplastic silane functional amorphous polyalphaolefin having a weight average molecular weight of less than 100,000 g/mol.

11. The sealant composition of claim 1, comprising
    from 1% by weight to 10% by weight of the silane functional polyurethane,
    from 10% by weight to 30% by weight of the thermoplastic elastomer, and
    no greater than 40% by weight total tackifying agent.

12. The sealant composition of claim 1, comprising
    from 1% by weight to 10% by weight of the silane functional polyurethane,
    from 10% by weight to 30% by weight of the thermoplastic elastomer,
    from 10% by weight to 25% by weight of the first tackifying resin, and
    from 5% by weight to 20% by weight of the second rosin-based tackifying agent.

13. The sealant composition of claim 12 further comprising at least 5% by weight amorphous polyalphaolefin.

14. The sealant composition of claim 12 further comprising from 10% by weight to 30% by weight silane functional amorphous polyalphaolefin.

15. The sealant composition of claim 1, wherein the sealant composition exhibits a moisture vapor transmission rate of no greater than 25 g/m$^2$/day.

16. The sealant composition of claim 1, wherein the sealant composition exhibits a property selected from the group consisting of
    at least 100% elongation,
    a shear adhesion failure temperature of at least 70° C.,
    a 60° C. dead load of at least 200 minutes, and
    combinations thereof.

17. A moisture curable hot melt sealant composition comprising:
    from 1% by weight to no greater than 10% by weight of a silane-functional polyurethane that is free of isocyanate groups;
    at least 10% by weight of a thermoplastic elastomer having a weight average molecular weight of at least 100,000 g/mol and being derived from 0% by weight to no greater than 30% by weight styrene, based on the weight of the thermoplastic elastomer, the thermoplastic elastomer being selected from the group consisting of butyl rubber, polyisobutylene rubber, ethylene-propylene rubber, ethylene-propylene diene rubber, thermoplastic polyolefin elastomer, styrene block copolymer, and combinations thereof;
    at least 10% by weight of a first tackifying agent that includes from 0% by weight to less than 15% by weight aromaticity based on the weight of the first tackifying agent, the first tackifying agent being selected from the group consisting of aliphatic tackifying agent, aromatic-modified aliphatic tackifying agent, cycloaliphatic tackifying agent, aromatic-modified cycloaliphatic tackifying agent, and combinations thereof; and
    a liquid butene component selected from the group consisting of polyisobutylene, polyisobutene, polybutene, and combinations thereof.

18. The sealant composition of claim 17, wherein the sealant composition exhibits a property selected from the group consisting of
    a peel strength of at least 20 pounds per linear inch (pli) when tested according to the 180 Degree Peel Adhesion test method using a glass substrate and a black line stainless steel substrate,
    a peel strength of at least 50 pli when tested according to the Climbing Drum Peel test method using a glass substrate and a black line stainless steel substrate,
    a peel strength to polyvinyl chloride of at least 12 pli when tested according to the 180 Degree Peel Adhesion test method using a polyvinyl chloride substrate and a 30 mesh steel screen substrate, a peel strength of at least 20 pli to a polar substrate having a surface energy greater than 32 dynes/cm when tested according to the 180 Degree Peel Adhesion test method using a glass substrate and a polar substrate having a surface energy greater than 32 dynes/cm, and combinations thereof.

19. An insulating glass unit comprising:
a first pane of glass;
a second pane of glass;
a spacer disposed between the first pane of glass and the second pane of glass, and
the sealant composition of claim 1 in contact with the first pane of glass, the second pane of glass, and the spacer.

20. A window comprising:
an insulating glass unit comprising
   a first pane of glass,
   a second pane of glass,
   a spacer disposed between the first pane of glass and the second pane of glass, and
   a first sealant composition in contact with the first pane of glass, the second pane of glass, and the spacer,
a frame; and
a second sealant composition in contact with the insulating glass unit and the frame, the second sealant composition comprising the sealant composition of claim 17.

* * * * *